J. F. MANNING.
STANCHION.
APPLICATION FILED FEB. 9, 1914.
1,126,540.
Patented Jan. 26, 1915.
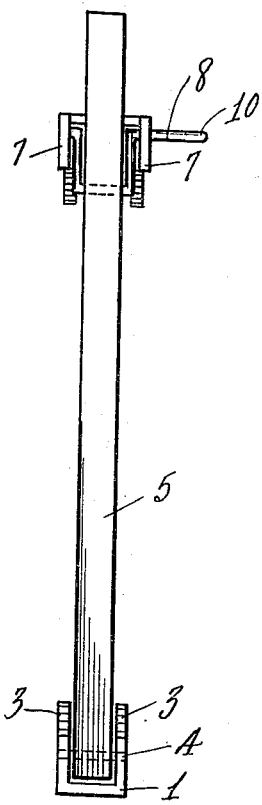
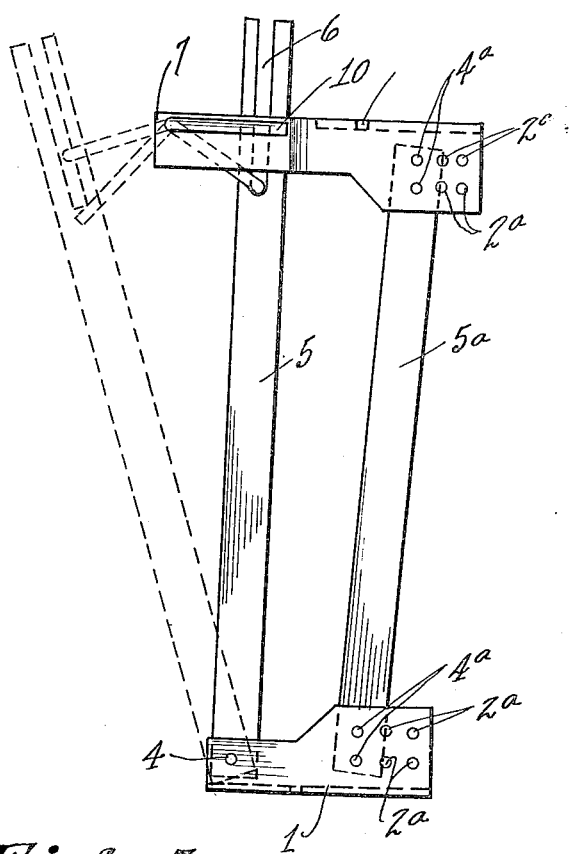
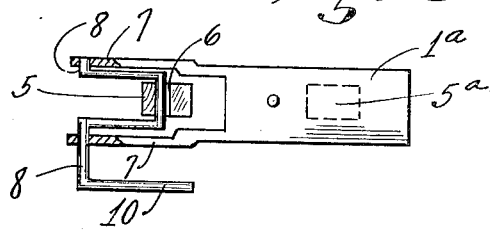
Inventor
James F. Manning

UNITED STATES PATENT OFFICE.

JAMES F. MANNING, OF MINOT, MAINE.

STANCHION.

1,126,540.  Specification of Letters Patent.  Patented Jan. 26, 1915.

Application filed February 9, 1914. Serial No. 817,672.

*To all whom it may concern:*

Be it known that I, JAMES F. MANNING, a citizen of the United States, residing at Minot, in the county of Androscoggin and State of Maine, have invented certain new and useful Improvements in Stanchions; and I do hereby declare the following to be a full, clear, and exact description of the invention, such as will enable others skilled in the art to which it appertains to make and use the same.

This invention relates to stanchions, and one of the principal objects of the invention is to provide simple and reliable means for holding the pivotal bar in opened and closed position without requiring the adjustment of bolts and nuts.

Another object of the invention is to provide a stanchion having an adjustable lower bar, and a pivoted upper bar, said upper bar being mounted upon a crank shaft, the crank portion of which is mounted to move in a slot of said pivoted bar, and to have the crank portion at one side of the dead center when in locked or unlocked position, so that the bar cannot be moved by the animal.

These and other objects may be attained by means of the construction illustrated in the accompanying drawing, in which, Figure 1 is a side elevation of a stanchion made in accordance with this invention and showing the pivotal bar in its opened position in dotted lines. Fig. 2 is a side elevation of the same, Fig. 3 is a top plan view.

Referring to the drawing, the numeral 1 designates the base member of the stanchion, said member being provided with a series of perforations 2 in the spaced flanges 3 thereof. Pivotally connected at 4 near one end of the member 1 is the swinging bar 5. The upper member 1ª is provided with a series of perforations 2ª in the oppositely disposed flanges 3ª, and the bar 5ª is adjustably mounted between the flanges 3 and 3ª, and secured in adjusted position by means of the bolts 4ª.

The bar 5 is provided with a slot 6 at its upper end and pivoted in the base extensions 7 is a crank shaft 8, the crank portion 9 of which is disposed in the slot 6 of the bar 5. The crank shaft 8 is provided with a crank handle 10 for operating the bar 5. When the bar 5 is in curved position, it will be noted that the crank portion 9 of the crank shaft is some distance below the dead center of the crank, and in this position the bar 5 cannot be moved by the cow or other animal. It will also be noted that when the bar 5 is moved to the dotted line position in Fig. 1 that the crank portion 9 is also below the dead center and cannot be moved inward by accident.

From the foregoing it will be obvious that a stanchion made in accordance with this invention is simple in construction, can be adjusted readily, and when the pivotal bar is swung into closed position by the crank shaft, it will be automatically locked in this position and cannot be opened out by accident, or by the movements of the animal.

Various changes may be made in the details of construction without departing from the spirit and scope of the invention as defined in the claims.

What is claimed is:—

1. A stanchion having a pivotal bar provided with a slot, a crank shaft having its crank portion mounted in said slot, and a crank handle for operating said crank shaft for holding the pivoted bar in an unlocked position, the crank portion of the crank shaft lying below the dead center when in locked and in unlocked positions.

2. A stanchion comprising two members, means for adjustably holding a bar in said members, a second bar pivoted to one of the said members, said bar having a slotted end and a crank shaft mounted in one of the members to move said bar into locked and unlocked positions.

3. A stanchion comprising a base member, an upper member, said members being provided with a series of perforations to permit the adjustment of the rigid bar, a bar pivoted to one of said members, and provided with a slot, a crank shaft having its crank portion disposed in said slot, and a crank handle disposed out of alinement with the crank portion, so that when the crank portion is in locked or opened position it lies below the dead center of the shaft.

In testimony whereof I affix my signature in presence of two witnesses.

JAMES F. MANNING.

Witnesses:
S. J. WHITTEMORE,
STEPHEN M. ATTWOOD.

Copies of this patent may be obtained for five cents each, by addressing the "Commissioner of Patents, Washington, D. C."